(12) United States Patent
Hallowell

(10) Patent No.: US 6,909,959 B2
(45) Date of Patent: Jun. 21, 2005

(54) TORQUE DISTRIBUTION SYSTEMS AND METHODS FOR WHEELED VEHICLES

(76) Inventor: Stephen James Hallowell, 35 Dimick St., Apt. 3, Somerville, MA (US) 02143

( * ) Notice: Subject to any disclaimer, the term of this patent is extended or adjusted under 35 U.S.C. 154(b) by 0 days.

(21) Appl. No.: 10/384,157

(22) Filed: Mar. 7, 2003

(65) Prior Publication Data

US 2004/0176899 A1 Sep. 9, 2004

(51) Int. Cl.[7] .................................................. B60T 7/12
(52) U.S. Cl. ........................................... 701/88; 701/91
(58) Field of Search ............................... 701/88, 91, 84, 701/82, 83, 79, 89, 90, 93, 70, 74, 71, 69; 180/197; 303/133

(56) References Cited

U.S. PATENT DOCUMENTS

| | | | |
|---|---|---|---|
| 5,148,883 A | 9/1992 | Tanaka et al. | |
| 5,164,903 A | 11/1992 | Lin et al. | |
| 5,343,971 A | 9/1994 | Heidelberg et al. | |
| 5,376,868 A | 12/1994 | Toyoda et al. | |
| 5,453,930 A | 9/1995 | Imaseki et al. | |
| 5,465,806 A | 11/1995 | Higasa et al. | |
| 5,508,924 A | 4/1996 | Yamashita | |
| 5,549,172 A | 8/1996 | Mutoh et al. | |
| 5,850,616 A | 12/1998 | Matsuno et al. | |
| 5,879,265 A | 3/1999 | Bek | |
| 6,208,929 B1 | 3/2001 | Matsuno et al. | |
| 6,422,333 B1 | 7/2002 | Kjaer et al. | |
| 6,564,140 B2 * | 5/2003 | Ichikawa et al. | 701/91 |
| 6,679,807 B2 * | 1/2004 | Kato et al. | 477/107 |

OTHER PUBLICATIONS

Sakai and Hori, "Lateral Motion Stabilization with Feedback Controlled Wheels –Experimental Studies with 4–Wheel Motored EV–", Proc. 6th International Symposium on Advanced Vehicle Control (AVEC), 2002, pp. 815–820, Hiroshima, Japan.

Anwar, "A Predictive Control Algorithm for a Yaw Stability Management System", Vechile Dynaimcs & Simulation, 2003 (SP–1778), pp. 189–198.

Sakai, Sado and Hori, "Motion Control in an Electric Vehicle with 4 Independently Drive In–Wheel Motors", IEEE Transactions on Mechatronics, vol. XX, No. Y., Mar. 1999, pp. 1–8.

Sakai and Hori, "Stable Lateral Motion Control with Motor–controlled Wheels", Proc. The 19th Electric Vehicle Symposium (EVS), 2002, 12 pages, Busan, Korea.

(Continued)

*Primary Examiner*—Thomas G. Black
*Assistant Examiner*—Christine M. Behncke
(74) *Attorney, Agent, or Firm*—Lathrop & Gage, L.C.

(57) ABSTRACT

A system controls torques applied to a plurality of wheels of a motor vehicle. One or more angular velocity sensors determine speed for each of the plurality of wheels. A vehicle yaw acceleration sensor determines actual yaw acceleration of the vehicle. A desired yaw acceleration sensor determines intended yaw acceleration for the vehicle. A net torque command sensor determines intended vehicle direction and intended torque magnitude for the vehicle. An electronic control unit processes data from the velocity sensors, the vehicle yaw acceleration sensor, the desired yaw acceleration sensor and the net torque command sensor to generate torque signals for the plurality of wheels. One or more torque producers responds to the torque signals to vary torque applied to each of the plurality of wheels, such that the wheels engage in one of acceleration and deceleration dependent upon driver intent and with controlled traction. Torque distribution among a plurality of wheels limits wheel slip, improves traction, and produces a yaw moment to correct oversteer or understeer conditions.

32 Claims, 11 Drawing Sheets

OTHER PUBLICATIONS

Tahami, Farhanghi and Kazemi, "Stability Assist System for a Two–Motor–Drive Electric Vehicle using Fuzzy Logic", Society of Automotive Engineers technical paper 2003–01–1285, Vehicle Dynamics and Simulation, 2003, pp. 199–206.

Tahami, Kazemi and Farhanghi, "Direct Yaw Control of an All–Wheel–Drive EV Based on Fuzzy Logic and Neural Networks", Society of Automotive Engineers technical paper 2003–01–0956, Vehicle Dynamics and Simulation, 2003, pp. 1–7.

* cited by examiner

TORQUE DISTRIBUTION SYSTEMS AND METHODS FOR WHEELED VEHICLES

BACKGROUND

Automotive engineers have long sought ways to improve vehicle handling and dynamic stability on low-friction road surfaces and under extreme steering inputs, for example during emergency situations. Until very recently, this technology has been limited by drive train technologies designed around a single power source, such as an internal combustion engine or electric motor.

One of the parameters that must be taken into consideration in automotive design is wheel slip, which is the difference between the velocity of a vehicle over a road and the velocity at which the outer edge of a tire mounted upon a wheel of the vehicle is moving. The terms "wheel" and "tire" are used interchangeably herein to refer to the combination of the tire mounted upon the wheel. Wheel slip is often expressed as a ratio (the "wheel slip ratio"), representing the difference of wheel and road velocities to the greater of the road and tire velocities. A modest amount of slip is desirable to produce tractive forces, but excessive slip prevents the tire from producing lateral forces and adequate longitudinal forces.

A wheel is said to "slip" or "spin" when the wheel exhibits a slip ratio approaching one. This occurs when a positive (accelerating) torque is applied to the wheel, and the edge of the tire has a higher velocity than the vehicle. Traction control, for example, is a known vehicle system that is designed to limit wheel spin. Conversely, a phenomenon called "locking" occurs when a negative (braking) torque is applied to a wheel. In locking, the outside edge of the tire has a lower velocity than the vehicle (e.g., the wheel stops completely relative to the vehicle), and the slip ratio approaches negative one. Anti-lock Braking Systems (ABS) are examples of vehicle systems designed to eliminate wheel locking.

Conventional motor vehicles are often driven by a single power source connected to the drive wheels by a transmission and differential. This arrangement has the marked disadvantage that if one drive wheel is on a slippery surface, the vehicle may be immobilized as the differential sends all power to the wheel least able to transmit power to the road. One way engineers have dealt with this problem is to limit the difference in speed between the two drive wheels, either through limited-slip differentials that mechanically limit the speed difference between the half-shafts to the two drive wheels, or through a brake system that brakes a slipping wheel (a technique often referred to as traction control).

If both drive wheels are on a slippery surface, however, such techniques have limited utility. This problem led to the development of four-wheel drive (4WD) and all-wheel drive (AWD) vehicles. In a 4WD vehicle, the differentials are locked, forcing all wheels to rotate at the same speed. While very effective at propelling the vehicle under slippery conditions, 4WD vehicle systems force wheels to skid around corners on dry roads, make the vehicle very difficult to drive in high-traction conditions. AWD vehicles use any of a number of systems, including the limited-slip differentials and traction control systems mentioned above, to limit wheel slip enough to maintain traction but without impeding cornering. These vehicle systems have enjoyed increasing popularity in recent years.

Nonetheless, these systems have a number of problems. In one example, the task of splitting power from one source to four drive wheels in an optimal fashion is very difficult to do mechanically. The problem is further complicated because the "optimal fashion" constantly changes with (a) varying road conditions and (b) the instantaneous weight distribution on the four wheels. The prior art has attempted to introduce mechanical devices to facilitate proper torque distribution, but such devices are heavy and complex, difficult to manufacture, subject to mechanical wear, and inefficiently waste fuel and power from the drive system. U.S. Pat. Nos. 5,850,616 and 6,208,929 describe exemplary AWD systems that are subject to limitations associated with distributing power from one power source to four wheels.

Certain vehicles, either with or without AWD, employ yaw moment control (YMC) systems. YMC systems are designed to produce a yaw moment that supplements the moment normally produced by vehicle tires by applying either positive or negative torques to selected wheels. The resulting yaw moment gives the vehicle increased turning ability in emergency situations and can correct understeer or oversteer conditions. Understeer refers to a situation where a vehicle does not turn as quickly as the driver intends due to insufficient lateral force in the front wheels; oversteer refers to a situation where a vehicle turns more quickly than the driver intends due to insufficient lateral force in the rear wheels. Current YMC systems suffer from a number of limitations. For example, YMC systems function primarily by applying a negative, or braking, torque to selected wheels, and as such, are very limited in their ability to make use of positive, or driving torque. This substantially limits the maximum yaw moment that is generated under a number of circumstances and prevents use in situations where the driver wishes to accelerate rather than decelerate.

The prior art algorithms used to determine braking torque at each wheel have similar limitations. Less advanced systems rely on lookup tables to dictate vehicle response. Such tables reduce vehicle response characteristics to a small number of predetermined possibilities that are not therefore tailored to actual and real-time driving conditions. Other systems rely on complex real-time simulation of vehicle parameters, such as the road coefficient of friction ($\mu$) and the wheel slip angle ($\alpha$). These simulations require substantial computing power and do not account for situations where model assumptions are violated or the underlying vehicle dynamics are incomplete.

A further disadvantage of both traction control and YMC systems as currently implemented is that these systems waste energy. Traction control and YMC systems generally rely on friction brakes, which turn kinetic energy to heat. This heat is radiated to the atmosphere and is not reused by the vehicle.

Advances in electric drive technologies have increased the options in designing automotive drive systems. Certain hybrid vehicle systems that use a generator in combination with an internal combustion engine to produce electricity, and certain fuel cell systems generate electrical energy directly. This electrical energy may be used to power an electric motor that provides traction for the vehicle. The torque output of such motors may be directly controlled; the motors may also be used as generators that brake the vehicle by transforming kinetic energy to electrical energy, which may then be re-used to increase overall efficiency. Further efficiency gains may be made because electrically-driven vehicles do not generally require multi-speed transmissions, thereby eliminating one source of power loss and reducing complexity in the drive train.

While electrically-driven vehicles hold considerable promise, prior art designs have often been incremental; for example, electric-drive vehicles use the same drive configuration as vehicles with internal combustion engines, by substituting the electric motor in place of the internal combustion engine. In another example, power is still often transmitted to the wheels of an electric-drive vehicle by a differential, which is still subject to the flaws discussed above. Moreover, only the braking power from two drive wheels is captured regeneratively while the other two wheels still utilize friction brakes.

The prior art has employed separate electric motors to power each drive wheel on a vehicle. For example, one High Mobility Multipurpose Wheeled Vehicle (HMMWV, or Hummvee) uses individually-controlled drive motors to achieve high performance in off-road situations. Traction control routines have also been developed for an electric snow car used on steep, snowy roads at a ski resort. These applications do not, however, utilize vehicle dynamics in algorithmic solutions.

Certain other prior art distributes torque through use of independently-controlled motors. U.S. Pat. No. 5,343,971 proposes one driving arrangement based upon multiple individually-controlled electric motors; the '971 patent however provides little support as to how the system would function in actual driving conditions. By way of example, it leaves unresolved the issue of how to prevent controller action from inducing wheel slip. Increasing the torque assignment on a wheel that already has a relatively high slip value may cause the wheel to enter a slipping state, which adversely affects the vehicle's ability to follow an intended path.

U.S. Pat. No. 5,376,868 includes YMC but bases this control on coarse look-up tables. Such a scheme is not able to respond optimally to a wide range of driving conditions.

U.S. Pat. No. 5,465,806 features independently-controlled motors for each wheel and specifies how each wheel is independently steered. The '806 patent does not allow for YMC. Further, the addition of four wheel steering adds significant complexity and requires a departure from proven vehicle suspension designs. In one example, it has no provision for re-distributing torque away from a locked or spinning wheel.

U.S. Pat. Nos. 5,164,903, 5,148,883 and 6,422,333 describe techniques to distribute torque to different wheels based on loading. U.S. Pat. No. 5,508,924 implements traction control on a vehicle driven with four independently-controlled electric motors based on estimated wheel slip values. As above, such prior art does not utilize vehicle cornering dynamics or YMC.

Certain other prior art involving a vehicle with a plurality of motors focuses on efficiency gain rather than on improvements to vehicle dynamics, for example as described in U.S. Pat. Nos. 5,879,265, 5,453,930 and 5,549,172.

While the prior art has sought to improve vehicle handling through optimal torque distributions and the electric motor, known solutions are sub-optimal from with respect to vehicle dynamics and/or vehicle efficiency.

SUMMARY

The above-described patents provide useful background and are thus incorporated herein by reference: U.S. Pat. Nos. 6,422,333; 6,208,929; 5,879,265; 5,850,616; 5,549,172; 5,508,924; 5,465,806; 5,453,930; 5,376,868; 5,343,971; 5,164,903; and 5,148,883.

In one aspect, a torque distribution system and method is presented for determining torque values to be applied to a plurality of wheels of a vehicle, limiting wheel slip and generating a corrective moment about the yaw axis of the vehicle to improve vehicle stability and increase occupant safety. The torque values are determined relative to inputs representing a driver's desired vehicle behavior and the actual measured vehicle behavior. In one aspect, the systems and methods enable precise and dynamic responsiveness to a set of current conditions (i.e. driver inputs for net torque and yaw acceleration, road conditions, and vehicle state) in order to produce a vehicular response that closely matches the driver's intended response.

In one aspect, a method determines the values of torques to be applied to a plurality of wheels arranged on laterally opposing sides of a motor vehicle, to regulate wheel slippage and to generate a corrective moment about a yaw axis of the motor vehicle. This method includes the steps of: determining a vector of reference speeds for the wheels taking into account any wheel speed variation caused by turning of the wheels; setting a torque limit for each wheel by converting a current torque limit for a respective torque producer to a ratio of the torque limit to a maximum torque that the respective torque producer may produce; adjusting, for each wheel, the ratio of the torque limit to the maximum torque based on one or more of a measured current wheel speed, rate of change of the current speed for the respective wheel, and the value of the measured current wheel speed relative to the vector of reference speeds; determining the limit torque for each wheel from the adjusted ratio of the torque limit to the maximum torque for the respective wheel; measuring an actual yaw acceleration for the vehicle; measuring a desired yaw acceleration; measuring a magnitude and direction of a desired net torque; determining a target corrective moment; assigning torque values to the wheels on one or more of the laterally opposing sides of the vehicle to generate the target corrective moment; and adjusting the torque values based on the magnitude and direction of a desired net torque.

In another aspect, one torque distribution system determines the values of torques to be applied to a plurality of wheels arranged on laterally opposing sides of a motor vehicle. The system includes: means for independently applying varying torque values to at least two of the plurality of wheels forming controlled wheels, such that the torque values at least cause the controlled wheels to engage in one of acceleration and deceleration; means for detecting a value for the speed of each of the controlled wheels; an actual yaw acceleration sensor for determining the actual yaw acceleration of the vehicle; desired yaw acceleration sensor determining the driver's intent for the yaw acceleration of the vehicle; a desired net torque sensor or detector for determining the magnitude and direction of a desired net torque; and a torque computing means including means responsive to the speed values of the controlled wheels, the actual yaw acceleration, the desired yaw acceleration, and the desired net torque, for calculating the torque values. The torque computing means may thereby substantially limit the slipping or lockage of one or more of the controlled wheels by producing a torque distribution capable of generating the proper moment about a yaw axis of the vehicle.

In another aspect, a torque distribution system determines the values of torques to be applied to a plurality of wheels arranged on laterally opposing sides of a motor vehicle. The system of this aspect includes: means for independently applying varying torque values to at least two of the plurality of wheels forming controlled wheels, such that the torque values at least cause the controlled wheels to engage in one of acceleration and deceleration; means for detecting a value for the speed of each of the controlled wheels; an actual yaw acceleration sensor for determining the actual yaw acceleration of the vehicle; desired yaw acceleration sensor determining the driver's intent for the yaw acceleration of the vehicle; a desired net torque detection means, for determining the magnitude and direction of a desired net torque; a limit-setting means, responsive to the values for speeds of the controlled wheels, that determines limits for the torque values to substantially limit the slip of the controlled wheels; and, a torque computing means including means responsive to the values for speeds of the controlled wheels, the actual yaw acceleration, desired yaw acceleration, the torque limits, and the desired net torque, for calculating the torque values. The torque computing means may produce a torque distribution capable of generating a moment about a yaw axis of the vehicle to favorably affect the movement dynamics of the vehicle. Such a torque distribution is calculated in such a way as to reduce the probability that the resulting torque values will cause one or more of the controlled wheels to enter a slipping or locked state.

Certain torque distribution systems and methods thus advantageously use tractive forces that may be produced by any of the wheels of the vehicle so as to achieve accurate and dynamic responsiveness to measured dynamic vehicular conditions and desired driver inputs. Such torque distribution systems and methods dynamically respond to a wheel that is unable to produce the proper amount of torque, for instance if it is slipping, locked, or faulted, by re-assigning torque from that wheel to other wheels with minimized impact on overall vehicular response. In this way, the torque distribution system shifts reliance from mechanical controls and coupling to software-based electronic control and electrical coupling, so as to allow for more precise control of individual wheel torques. This further reduces manufacturing costs and increases efficiency both through reduced mechanical inefficiency and the ability to efficiently convert mechanical energy to electrical energy.

DETAILED DESCRIPTION

Table I shows and describes certain symbols as used in the following description and associated figures:

TABLE I

Symbol Descriptions

Figure 7:
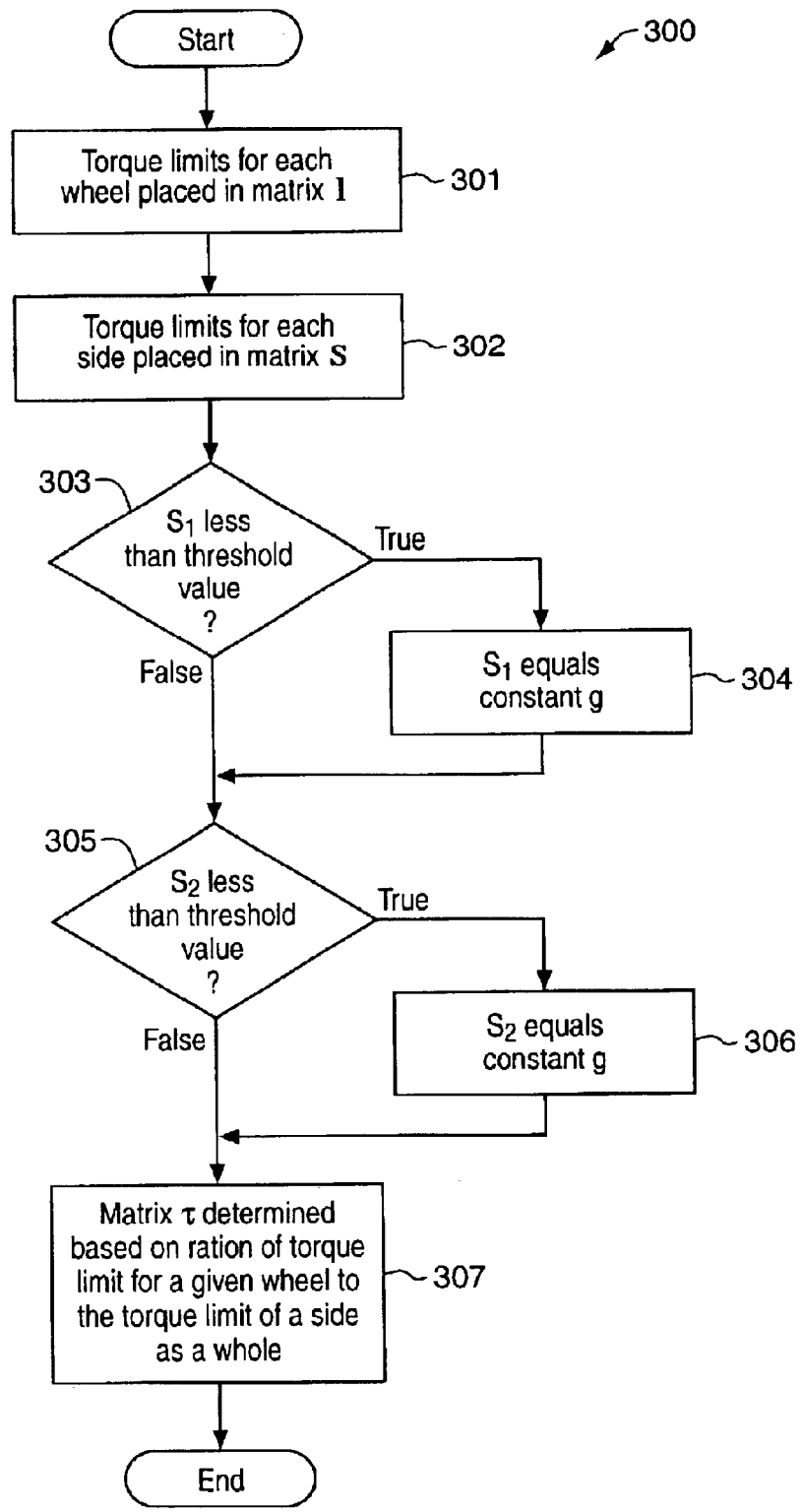
FIG. 7 shows a flowchart illustrating one routine that initially distributes a torque quantity on each side of the vehicle.

| Symbol | Name | Constant/ Variable | Description | Values |
|---|---|---|---|---|
| d | direction | var | Positive one if the driver intends to move forwards, and negative one if the driver intends to move in reverse | ±1 |
| $e_{cl}, e_{fl}, e_{fr}, e_{rl}, e_{rr}$ | turn radius | var | Turn radius of the centerline and individual wheels of the vehicle | $\Re > 0$ |
| g | large number | const | Used to prevent divide-by-zero, FIG. 7 | $\Re \gg 0$ |
| h | small limit threshold | const | Used to prevent divide-by-zero, FIG. 7 | $\Re > 0$ |
| $I_{zz}$ | yaw moment of inertia | const | Moment of inertia about yaw axis for vehicle | $\Re > 0$ |
| j | N/A | var | Ratio of the speed of a given wheel to the turn radius for that wheel | $\Re$ |
| K | moment constant | const | Scales magnitude of corrective moment | $\Re > 0$ |
| l | limit | var | Matrix of torque limits | $\Re \geq 0$ |
| $l_{fl}, l_{fr}, l_{rl}, l_{rr}$ | limit | var | Torque limit on an individual torque-producer | $\Re \geq 0$ |
| p | torque input | var | Driver's net torque command | $\Re$ |
| $q_l, q_r$ | side torque | var | Torque assigned to either the left or right side of the vehicle, respectively | $\Re$ |
| $\dot{r}$ | actual yaw acceleration | var | Actual yaw acceleration of vehicle | $\Re$ |
| $\dot{r}_d$ | desired yaw acceleration | var | Driver's desired yaw acceleration of vehicle | $\Re$ |
| S | side limits | var | Matrix of total limits for the left and right sides of the vehicle | $\Re$ |
| v | velocity | var | Current velocity of the vehicle | $\Re$ |
| $v_0$ | velocity threshold | const | Velocity below which the desired yaw moment may be overridden | $\Re \geq 0$ |
| w | wheelbase | const | Wheelbase of the vehicle | $\Re > 0$ |
| $\delta_f$ | steer angle | var | Steering angle of the front wheels | $\Re$ |
| $\delta_0$ | steer angle threshold | const | Threshold steering angle | $\Re$ |

TABLE I-continued

Symbol Descriptions

Figure 5:
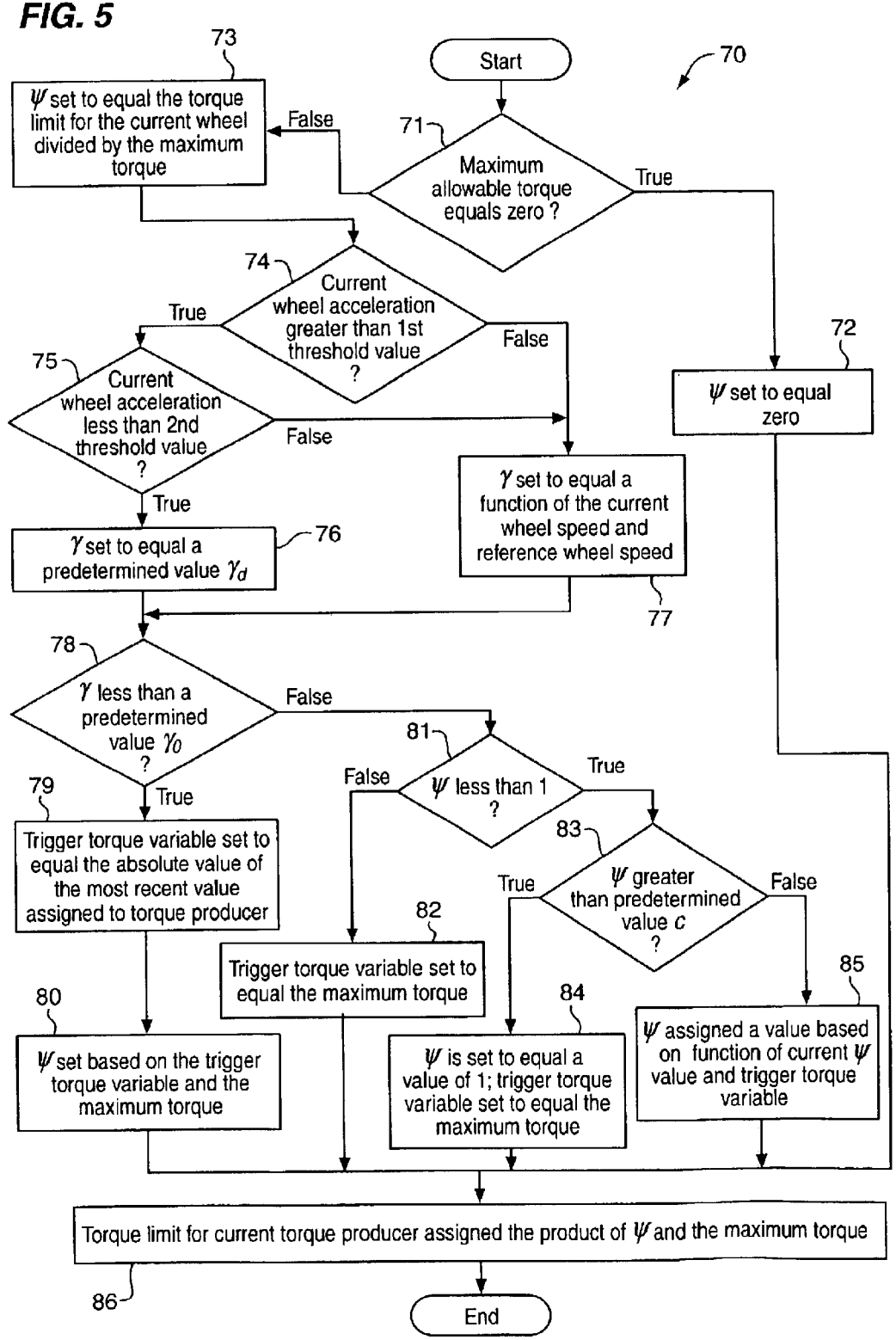
FIG. 5 shows a flowchart illustrating one routine that sets torque limits on each wheel.
Figure 9:
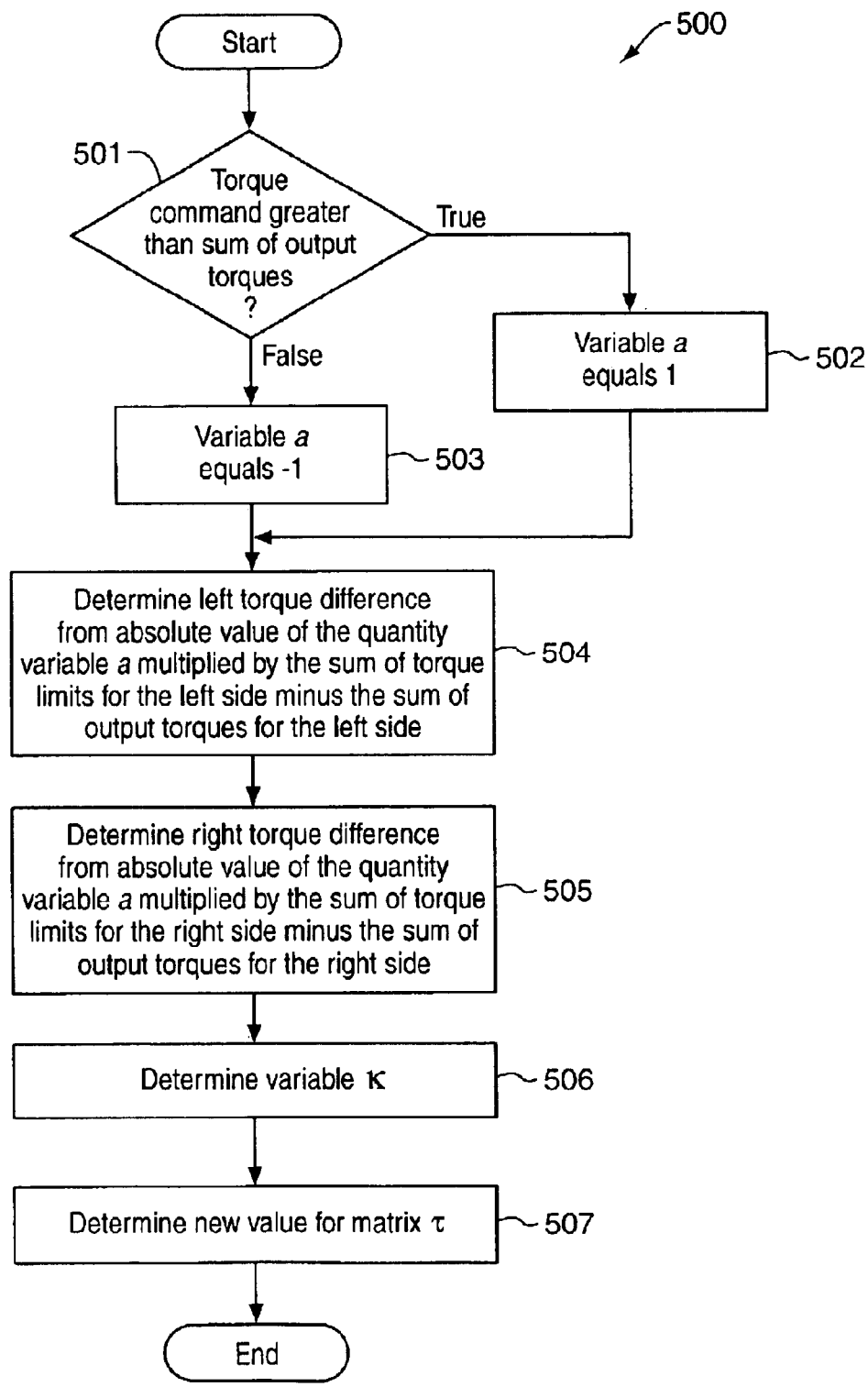
FIG. 9 shows a flowchart illustrating one routine that adjusts the torque distribution to meet a net torque command.
Figure 10:
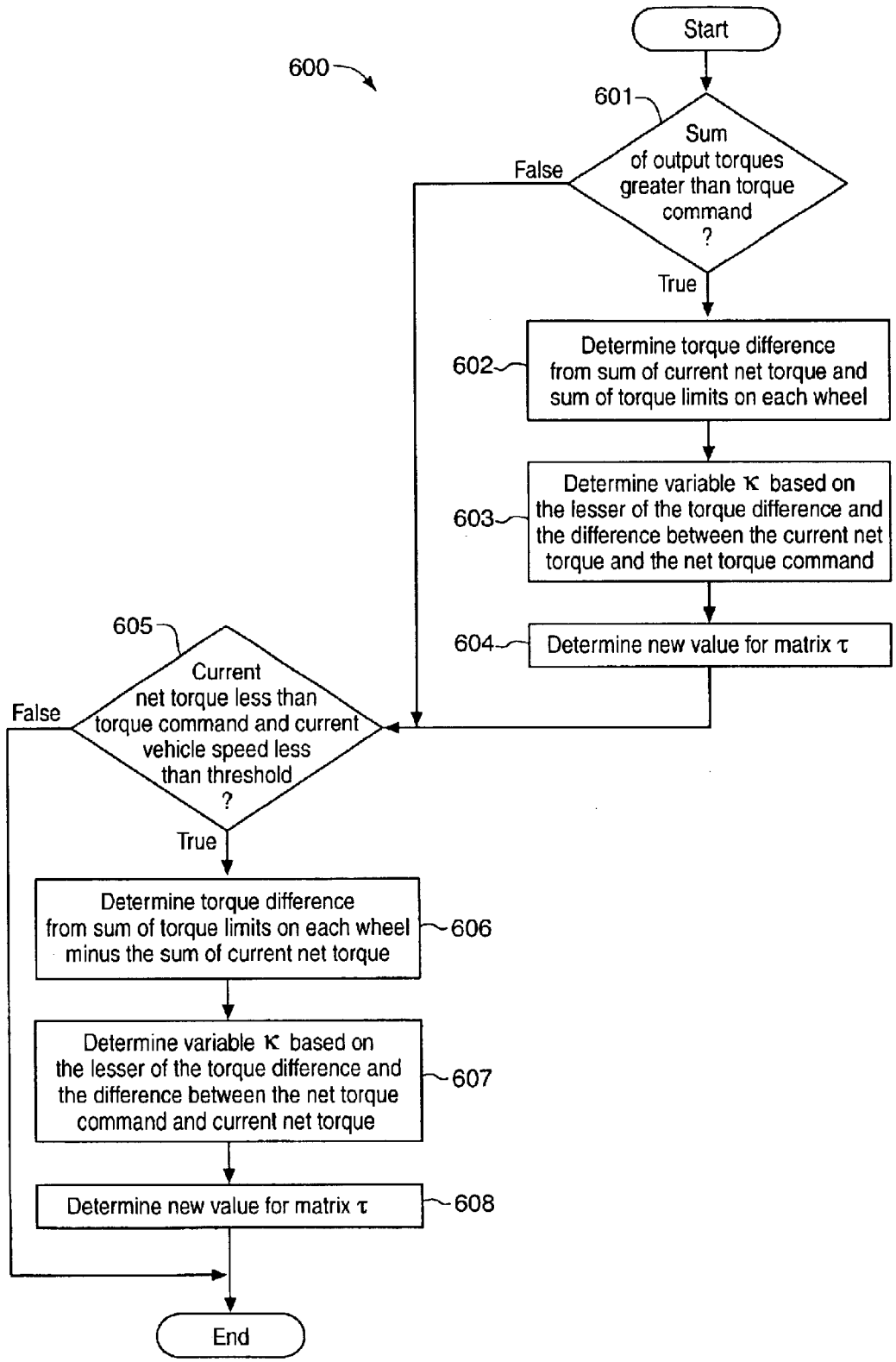
FIG. 10 shows a flowchart illustrating one routine that overrides a desired yaw movement under certain conditions.

| Symbol | Name | Constant/ Variable | Description | Values | |
|---|---|---|---|---|---|
| $\gamma$ | N/A | var | Defined in FIG. 5 | $\Re$ | $> 0$ |
| $\gamma_d, \gamma_0$ | N/A | const | Constants in FIG. 5 | $\Re$ | $> 0$ |
| $\rho_l, \rho_r, \rho$ | torque difference | var | The difference between torque limits and current torque values | $\Re$ | |
| $\kappa$ | N/A | var | Defined in FIGS. 9, 10 | $\Re$ | |
| $\tau$ | output torque | var | The output torque values for a given torque producer | $\Re$ | |
| $\tau_{max}$ | max torque | var | The absolute value of the maximum torque a given torque producer is capable of producing at a given time | $\Re$ | $\geq 0$ |
| $\tau_{trig}$ | trigger torque | var | The torque that initially triggered corrective action by the LSR | $\Re$ | $> 0$ |
| $\psi$ | torque limit ratio | var | A ratio of the torque limit for a given torque producer to the current maximum possible torque for that torque producer | $\Re$ | $> 0$ |
| $\xi$ | N/A | var | Defined in FIG. 6 | $\Re$ | |

Figure 1:
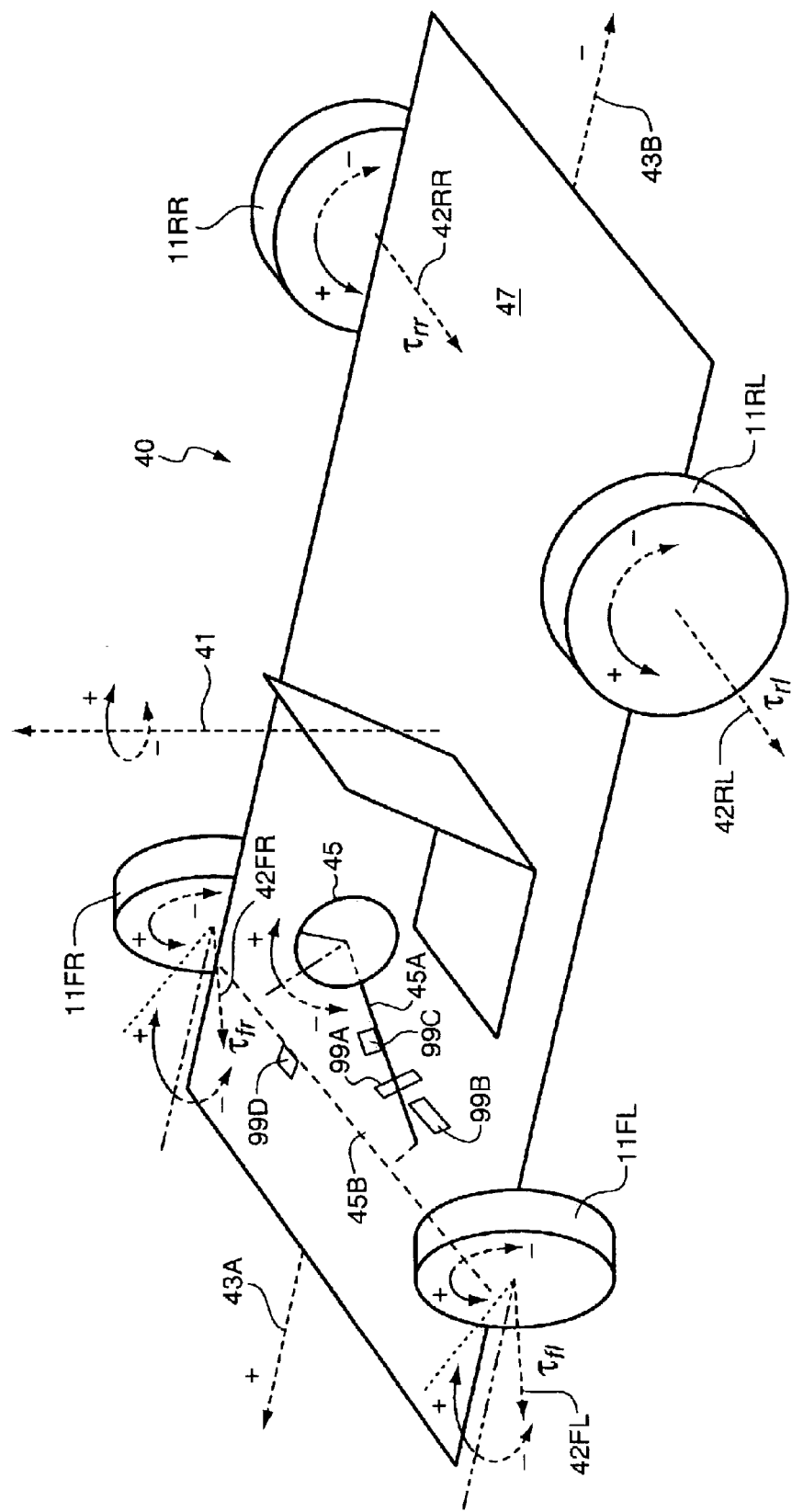
FIG. 1 shows a schematic diagram of a four-wheeled vehicle and associated sign conventions employed within one torque distribution algorithm.

FIG. 1 shows a schematic diagram of a wheeled vehicle 40 with associated sign conventions for a torque distribution algorithm. Vehicle 40 has four wheels 11FR (front right), 11FL (front left), 11RL (rear left), 11RR (rear right). Longitudinal velocities and accelerations in the forward direction 43A are positive; therefore, forward movement along direction 43A while braking has positive velocity but negative acceleration, while accelerating in reverse direction 43B has negative velocity and negative acceleration. The torque values vectors 42FL, 42FR, 42RL, and 42RR associated with wheels 11FL, 11FR, 11RL, and 11RR are positive if the torque results in a positive acceleration. Each wheel 11 typically has a tire mounted thereon, and is modeled as a single unit.

Turns to the driver's right, (i.e., to the right of wheel 11FR) are considered positive, as indicated by the positive arrow indicator associated with a yaw, or vertical, axis 41 of vehicle 40. A moment about yaw axis 41 that causes vehicle 40 to turn in a positive direction is also considered positive. Turning a steering wheel 45 clockwise to initiate a right hand turn is also positive.

Figure 2:
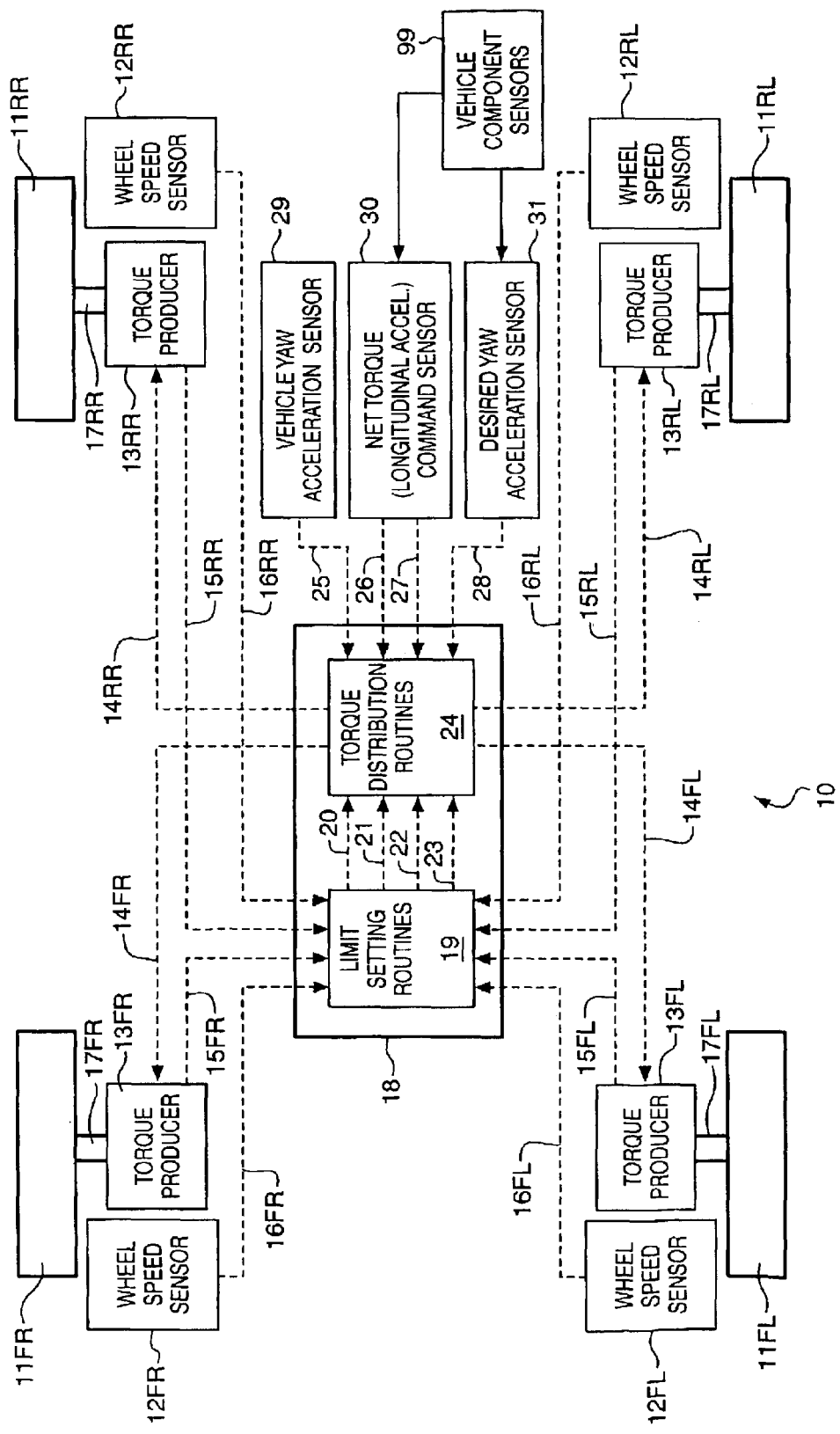
FIG. 2 shows a schematic diagram of one torque distribution system.

A schematic representation of a torque distribution system 10 is shown in FIG. 2. In FIG. 2, vehicle 40 is shown in a top-view orientation with four wheels 11 at each corner. An electronic control unit (ECU) 18 processes two separate routines 19 and 24. Routine 19 is a limit-setting routine (LSR) that sets limits on the torque as applied to each wheel 11FL, 11FR, 11RL, and 11RR, in order to limit the slip thereof. Routine 24 is a torque distribution routine (TDR) that determines how much torque is applied to each wheel. As described in more detail below, TDR 24 receives information about the driver's intent for the behavior of the vehicle 40, and information about the vehicle's actual behavior, and sends commands specifying the amount of torque to be produced at each wheel 11. TDR 24 thus determines how to distribute torque among wheels 11 to best match the driver's commands within the torque limits of LSR 19.

The driver's intent is captured with a net torque command sensor 30 and a desired yaw acceleration sensor 31. Net torque as determined through sensor 30 may also be considered "longitudinal acceleration." Sensor 30 may for example operate to detect positions of certain components of vehicle 40, e.g., the accelerator or brake pedals 99A, 99B, drive selector and/or shift lever (not shown); sensor 30 then outputs two signals 26 and 27 to TDR 24, respectively representing a signed torque value and the intended direction of travel. By way of example, when the drive selector is in drive, or forward, depression of the accelerator pedal indicates an increasingly positive desired net torque (or positive longitudinal acceleration), while depression of the brake pedal indicates an increasingly negative desired net torque. When the drive selector is in reverse, depression of the accelerator pedal indicates an increasingly negative desired net torque, while depression of the brake pedal indicates an increasingly positive desired net torque. The intended direction of travel will have values of either positive or negative one, for forward and reverse, respectively, that for this example correspond to the position of the drive selector.

In one illustrative embodiment, net torque command sensor 30 includes an optical detector that detects positions and magnitude of one or more of the above-described components (e.g., brake pedal, drive selector, shift lever) of vehicle 40. Those skilled in the art appreciate that sensor 30 may include other devices without departing from the scope hereof; for example, sensor 30 may include a linear array of resistors that determine component position. In one illustrative embodiment, sensor 30 uses data from one or more vehicle component sensors 99, FIG. 2 (which may be integrated with sensor 30 as a matter of design choice). Accordingly, sensor 30 may thus operate to determine intended vehicle direction (e.g., forward direction 43A or reverse direction 43B) and a magnitude of desired torque in that direction. By way of example, if the drive selector is in "forward" and a driver presses the accelerator half-way to the floor, he intends to acquire a positive net torque equivalent to a magnitude defined by the half-way position of the accelerator. In another example, if the drive selector is in forward and the driver steps on the brake a maximum amount, he intends to acquire a negative net torque equivalent to a maximum braking command.

Those skilled in the art appreciate that control of vehicle 40 while in "reverse" essentially may operate in reverse to the above-described directions 43A, 43B. Moreover, sensor 30 may operate to obtain magnitude and direction of driver intent through other mechanisms, for example drive-by-wire control switches used in certain vehicles.

Desired yaw acceleration sensor 31 sends a signal 28 to TDR 24; signal 28 represents the driver's intended yaw acceleration. This may be obtained by measuring the rate of change of the average angle of front wheels 11FR, 11FL relative to a body of vehicle 40; vehicle speed may also be used in this measurement. In one embodiment, signal 28 is filtered through a low-pass filter to reduce noise.

In one illustrative embodiment, desired yaw acceleration sensor 31 measures the rate at which the steering angle changes to determine the driver's intended yaw acceleration. By way of example, sensor 31 may measure the position of the steering shaft 45A or steering linkage 45B (e.g., with an optical encoder or potentiometer as sensor 99C or sensor 99D) and take a time derivative of that measured signal to determine intended yaw acceleration. Sensor 31 may also utilize vehicle velocity (for example, by acquiring a speed signal from ECU 18) as an input to a mathematical model in this determination to more accurately determine the intended yaw rate. In one illustrated embodiment, sensor 31 uses one or more vehicle component sensors 99, FIG. 2; in one embodiment, desired yaw acceleration sensor 31 utilizes a steering shaft sensor 99C or steering linkage sensor 99D, FIG. 1. Those skilled in the art appreciate that sensors 99 may feed directly to ECU 18 as a matter of design choice, rather than to sensor 30 as shown.

Sensors 99 are shown separately for purposes of illustration; those skilled in the art appreciate, for example, that sensor 31 may include one or more of sensors 99 as a matter of design choice. Moreover, other sensors 29, 31 may be grouped with sensors 30, 99 as a matter of design choice so long as like functionality is provided, without departing from the scope hereof.

Information about actual vehicle behavior is determined via a vehicle desired yaw acceleration sensor 29 and a plurality of wheel speed sensors 12FL, 12FR, 12RL, and 12RR; each wheel sensor 12 measures angular velocity of its associated wheel. In one example, each wheel sensor 12 is an optical encoder or magnetic induction sensor; those skilled in the art appreciate other techniques for measuring wheel speed.

Vehicle yaw acceleration sensor 29 may for example include a gyroscopic sensor (and associated logic), accelerometer(s) (and associated logic) or other device that measures actual yaw acceleration of vehicle 40 and sends a yaw acceleration signal 25 to TDR 24; it may also filter signal 25 if desired. Each wheel speed sensor 12 operates to measure actual speed and direction of its respective wheel and sends a signal 16 to LSR 19. Specifically, wheel speed sensor 12FR sends signal 16FR to LSR 19; wheel speed sensor 12FL sends signal 16FL to LSR 19; wheel speed sensor 12RR sends signal 16RR to LSR 19; and wheel speed sensor 12RL sends signal 16RL to LSR 19.

A torque producer 13 couples with each wheel 11: torque producer 13FL produces torque for wheel 11FL; torque producer 13FR produces torque for wheel 11FR; torque producer 13RR produces torque for wheel 11RR; and torque producer 13RL produces torque for wheel 11RL. Torque producers 13FL, 13FR, 13RL, and 13RR receive respective torque commands 14FL, 14FR, 14RL, and 14RR from TDR 24, and send respective signals 15FL, 15FR, 15RL, and 15RR to LSR 19. Each signal 15 indicates a maximum amount of torque that may be produced at a given time. Signals 15FL, 15FR, 15RL, and 15RR may thus reflect limits on torque related to operating speed, unit temperature, and any other fault conditions. Each torque producer 13FL, 13FR, 13RL, and 13RR may for example be a combination of an induction motor and a device that controls the motor in torque, such as a motor controller, inverter, servo amplifier, and/or the like. Torque producers 13FL, 13FR, 13RL, and 13RR are connected to wheels 11FL, 11FR, 11RL, and 11RR, respectively, via mechanical transmissions 17FL, 17FR, 17RL, and 17RR.

ECU 18 independently processes LSR 19 and TDR 24. LSR 19 outputs unsigned (absolute) limits on the amount of torque each torque producer 13 may be commanded to produce as signals 20–23 (for example, signal 20 represents a torque limit for torque producer 13FR, signal 21 represents a torque limit for torque producer 13FL, signal 22 represents a torque limit for torque producer 13RR, signal 23 represents a torque limit for torque producer 13RL). These limits thus reflect both the physical capabilities of each torque producer 13 (as interpreted by input signals 15FL, 15FR, 15RL, and 15RR) and a limitation on wheel slip for each wheel 11. As described in more detail below, ECU 18 then functions to provide anti-lock braking, traction control and/or anti-slip control functions.

In one embodiment, LSR 19 runs continuously in ECU 18 on fixed time intervals; alternatively, LSR 19 runs separately for each wheel 11 as part of software that controls each torque producer 13. In either case, the operation of the routine may be the same. The first step of LSR 19 is to determine a vector for reference wheel speed relative to wheel speed difference caused by turning. Next, torque limits are set by converting the current limit on each torque producer 13 to a ratio of the limit torque to the maximum torque producible by torque producer 13; the torque limit is set according to the value of signal 15 from each torque producer 13. This ratio is then adjusted up or down on the basis of the current wheel speed, the rate of change of that wheel speed, and its value relative to the reference speed. Finally, the ratio is multiplied by the maximum torque to determine the limit torque 1 for the respective torque producer 13.

TDR 24 may run continuously within ECU 18 on fixed time intervals; shorter time cycles may yield better results so long as the cycles are not shorter than the response time of sensors 12, 29, 30, 31 or torque producers 13. In one simulated test, the algorithms of TDR 24 operated at approximately 67 Hz; however, other frequencies may be used as a matter of design choice.

Figure 3:
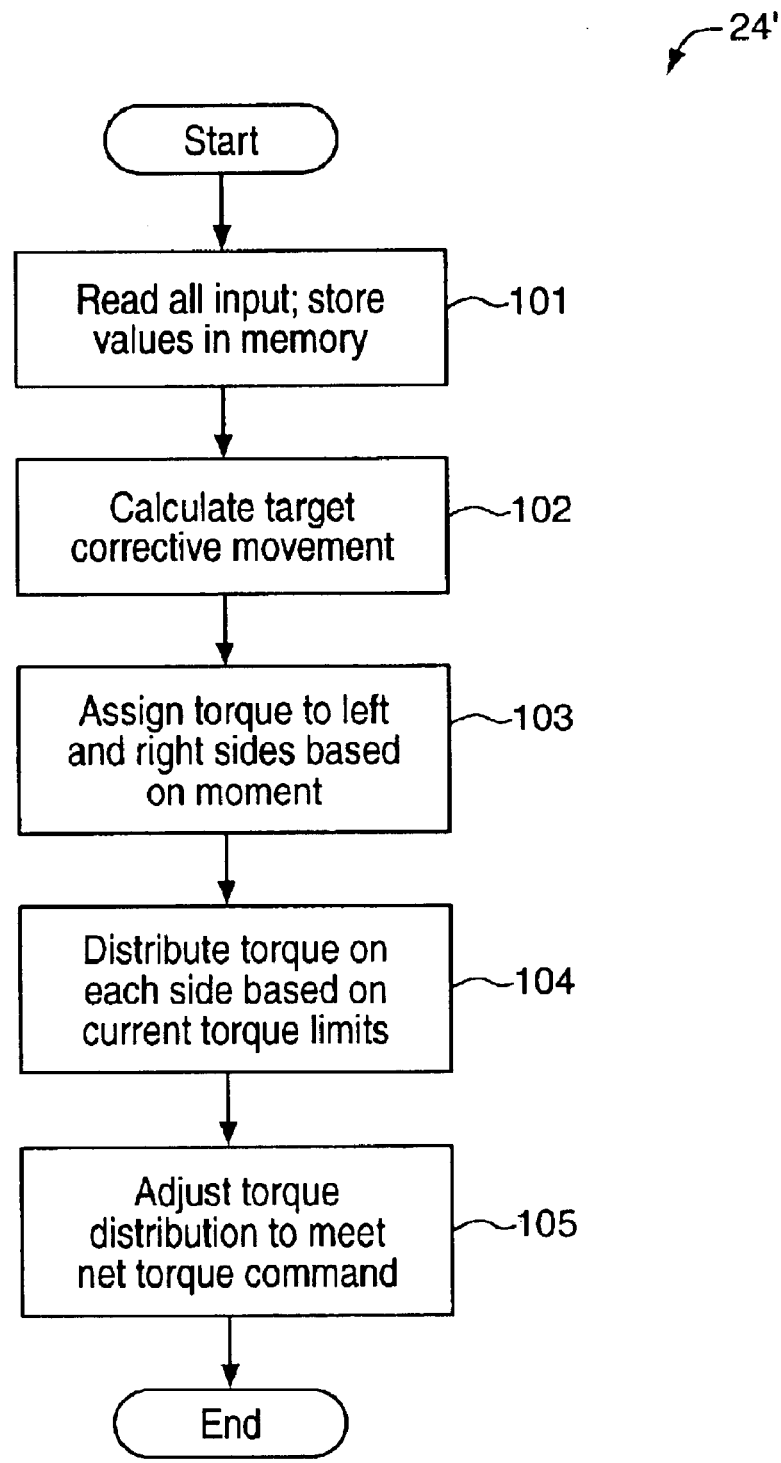
FIG. 3 shows a top-level flowchart illustrating operation of one torque distribution routine.

FIG. 3 shows a flowchart 24 illustrating one TDR 24'. First, in step 101, the current values of all inputs (net torque command, desired yaw acceleration, actual yaw acceleration, torque limits for each driven wheel, and the direction of travel) are read and stored in memory. Next, in step 102, TDR 24' determines a target corrective moment M. In one example, M is the product of a constant K, the moment of inertia of vehicle 40 about its yaw axis ($I_{zz}$), and the difference between the desired yaw acceleration ($\ddot{r}_d$) and the actual yaw acceleration ($\ddot{r}$). Other mathematical models may be used to determine M on the basis of the inputs above or other inputs. In step 103, TDR 24' determines how to best assign torque to the left and right sides of vehicle 40 in order to generate the target moment M. The resulting values for each side are then distributed between the front and rear wheels 11 of each side of the vehicle in step 104. Finally, in step 105, the torque values are adjusted based on the net torque command. TDR 24' does not necessarily meet both the net torque command and the target yaw moment simultaneously because of external limitations; however TDR 24' strikes a balance between the two torque values in step 105.

Figure 4:
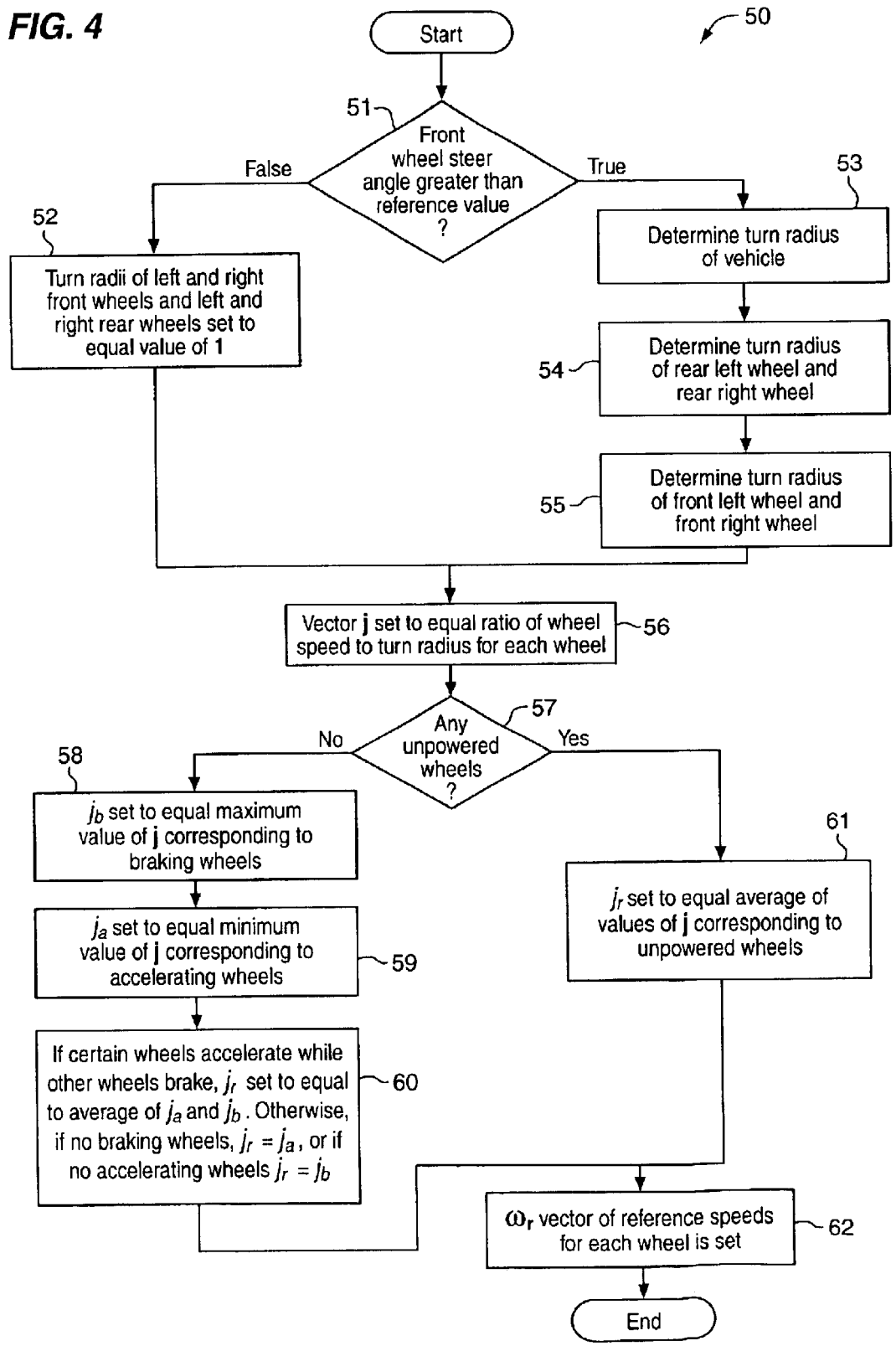
FIG. 4 shows a flowchart illustrating one routine to determine a reference wheel speed.

FIG. 4 shows a flowchart illustrating one routine 50 to determine a vector of reference wheel speeds. In step 51, it is determined whether the absolute value of the steer angle of the front wheels, $\delta_f$, is greater than a reference value $\delta_0$. If it is, in step 53, the turn radius of the centerline of the vehicle, $e_{cl}$, is set to equal the wheelbase of the vehicle w divided by the tangent of $\delta_f$. In step 54, the turn radii of the rear left and right wheels, $e_{rl}$ and $e_{rr}$, respectively, are determined from $$e_{rl} = \left|e_{cl} - \frac{t_r}{2}\right|, \; e_{rr} = \left|e_{cl} + \frac{t_r}{2}\right|$$

where $t_r$ represents lateral spacing between rear wheels 11RL and 11RR. In step 55, the turn radii $e_{fl}$ and $e_{fr}$ of front left and right wheels 11FL, 11FR, respectively, are set in to:

$$e_{fl} = \sqrt{e_{rl}^2 + w^2}, \; e_{fr} = \sqrt{e_{rr}^2 + w^2}$$

Accordingly, system 10 may sense the rate of change of the angle of steered wheels 11FL and 11FR relative to the body 47 of vehicle 40 (this change of angle may be proportional to angle of the steering wheel or steering linkage such as determined, for example, by sensor 99C, FIG. 1 or by sensor 99D, FIG. 1, respectively); this rate of change is the time derivative of $\delta_f$, for example by utilizing an optical encoder and/or potentiometer. System 10 illustrates vehicle component sensors 99 that may for example be used to measure the rate of change of the angle of steered wheels 11FL and 11FR relative to body 47 of vehicle 40.

If step 51 is false, the turn radii for the front and rear wheels are all set to equal one, in step 52. Next, a vector j is set to equal the ratios of wheel speed to turn radius for each wheel, in step 56, according to:

$$j = \left[ \frac{\omega_{fl}}{e_{fl}} \; \frac{\omega_{fr}}{e_{fr}} \; \frac{\omega_{rl}}{e_{rl}} \; \frac{\omega_{rr}}{e_{rr}} \right]$$

Once the speed/radius ratios are assigned, routine 50 determines, in step 57, if any wheels are unpowered based upon the last known values of torque assigned to the wheels. If one or more wheels are unpowered, the reference speed/radius ratio $j_r$ is set to equal the average ratio of all unpowered wheels, in step 61. In step 58, if no wheels are unpowered, $j_b$ is assigned to equal the maximum speed/radius ratio of all wheels that are currently braking. In step 59, $j_a$ is assigned to equal the minimum speed/radius ratio of all wheels that are currently accelerating. In step 60, $j_r$ is set to equal the average of $j_a$ and $j_b$ provided certain of the wheels are braking and certain other wheels are accelerating. If no wheels are accelerating, $j_r$ is set to equal $j_b$; if no wheels are braking $j_r$ is set to equal $j_a$. Finally, in step 62, the reference speed vector $\omega_r$ for each wheel is set to equal the product of $j_r$ and a vector of the turn radii for each wheel, according to:

$$\omega_r = j_r [e_{fl} \; e_{fr} \; e_{rl} \; e_{rr}]$$

Routine 50 is then exited or completed.

A torque limit setting routine 70 is shown in FIG. 5. Routine 70 is for example run once for each wheel 11 for each cycle. At the start of routine 70, a determination is made in step 71 as to whether the maximum allowable torque, or $\tau_{max}$ (initially set on the basis of signal 15 from torque producer 13) equals zero. If it does not, a variable $\psi$ is set in step 73 to equal the torque limit for the current wheel, l, divided by $\tau_{max}$. If it does, as it would in the case of a severe fault condition where a torque producer 13 is not able to produce any torque, $\psi$ is set to equal zero in step 72; routine 70 then processes step 86, as shown.

In steps 74 and 75, the acceleration of the current wheel $\dot{\omega}$ is compared to threshold values $\dot{\omega}_a$ and $\dot{\omega}_d$. If $\dot{\omega}$ is either greater than $\dot{\omega}_a$ or less than $\dot{\omega}_d$, a variable $\gamma$ is set to equal a predetermined value $\gamma_d$, in step 76. If both conditions are false, in step 77, $\gamma$ is set to equal a function $f_1$ of the current wheel speed $\omega$ and $\omega_r$, with elements of vector $\omega_r$ determined above and corresponding to the current wheel 11.

Step 78 determines if $\gamma$ is less than a predetermined value $\gamma_0$ (i.e., step 78 determines whether the wheel is slipping). If so, in step 79, a variable $\tau_{trig}$ is set to equal $|\tau|$, the absolute value of the most recent value of torque assigned to the current torque producer 13, and $\psi$ is determined, (step 80) from:

$$\psi = \frac{(\tau_{trig})(\gamma)}{\tau_{max}}$$

By way of example, step 79 may note the torque value that caused the wheel to slip.

Step 81 determines whether or not $\psi$ is less than 1 (i.e., step 81 determines whether the wheel slipped in the last cycle). If $\psi$ is not less than 1, step 82 sets $\tau_{trig}$ to equal $\tau_{max}$. By way of example, step 82 may reset the trigger torque value. If $\psi$ is less than 1, step 83 determines if $\psi$ is greater than a predetermined value c (i.e., step 83 may determine whether the wheel has recovered); step 84 then sets $\psi$ to equal one and $\tau_{trig}$ to equal $\tau_{max}$. If $\psi$ is not less than 1, step 85 assigns $\psi$ a value based on a function $f_2$ of the current value of $\psi$ and $\tau_{trig}$. By way of example, step 85 may serve to increase limit(s) on the wheel. Finally, in step 86, the torque limit l for the current torque producer 13 is assigned to be the product of $\psi$ and $\tau_{max}$. Routine 70 then completes or exits.

Select detailed operations of TDR 24' is shown in FIG. 6–FIG. 10. FIG. 6A and FIG. 6B provide detail on the operation of step 103, FIG. 3, as an initial torque assignment routine 200, which determines an initial side-to-side distribution of torque, based on the sign and magnitude of moment M, the sign of the longitudinal torque command, and the limits on each wheel 11. For example, consider a case where the longitudinal torque command (henceforth p) is positive, such as when vehicle 40 is accelerating and moving forward along direction 43A (FIG. 1). In this case, the sign of M is positive (it will turn the vehicle to the right) and the amount of torque required to produce M (henceforth ξ and defined by step 201, also a positive value) is less than the sum of the limits for the wheels on the left hand side of the vehicle. The initial distribution of torque is to set the total torque for the left hand side (henceforth $q_l$) as ξ, accordingly, the net torque is positive, which agrees with the sign of p. If ξ were greater than the torque limits on the left side, torque would be assigned to the left side up to the limit and then to the right side as a negative value. If the torque limit on the right side is reached as well, M will not be met.

To understand why this initial torque distribution is utilized, one may consider the effects of other extreme possibilities in assigning the total torque for the right hand side (henceforth $q_r$) as −ξ. While the total moment generated would be the same, the total torque would then have the opposite sign of p.

Process 200 distributes torque equally well in all four quadrants of operation (accelerating or braking in either forward or reverse). If vehicle 40 is braking in reverse, a positive torque may still be applied to the left hand side before applying negative torque to the right hand side.

Steps 204, 209, 215, and 220 of routine 200 determine if ξ "fits" on one side or if it needs to be split between the two sides of vehicle 40. In the former case, steps 205, 210, 216, and 221 assign the total value of ξ to the primary side. In the latter case, steps 206, 211, 217, and 222 assign the primary side a value of torque equal to the sum of the limits, and assign the secondary side the remaining amount of ξ. Steps 207, 212, 218, and 223 of routine 200 check that the limits are not exceeded for the secondary side; if they are, steps 208, 213, 219, and 224 reset the torque assignment for the secondary side to the limit of that side.

Figure 6A:
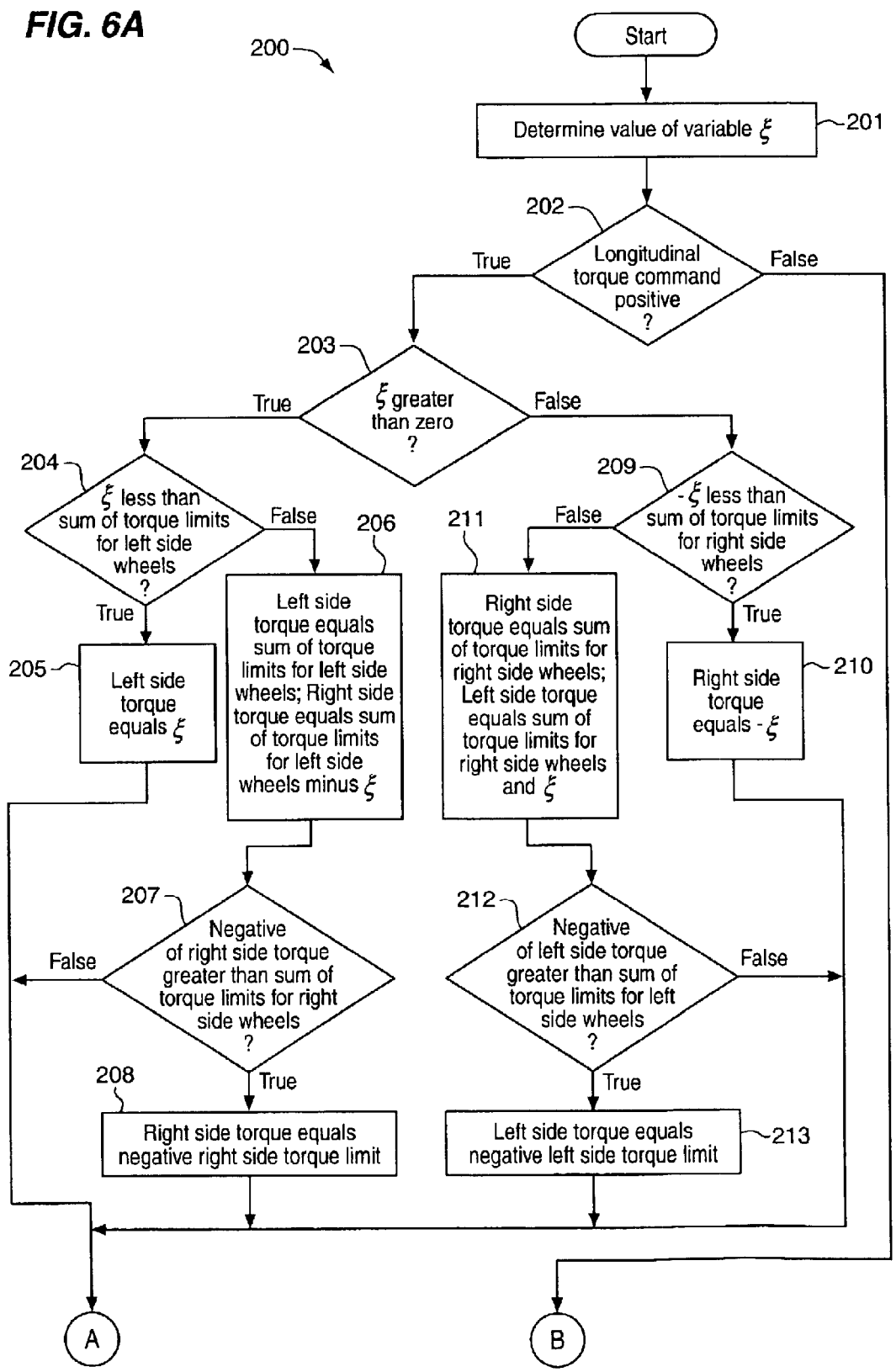
FIG. 6A and FIG. 6B show a flowchart illustrating one routine that assigns an initial torque to each side of the vehicle.
Figure 6B:
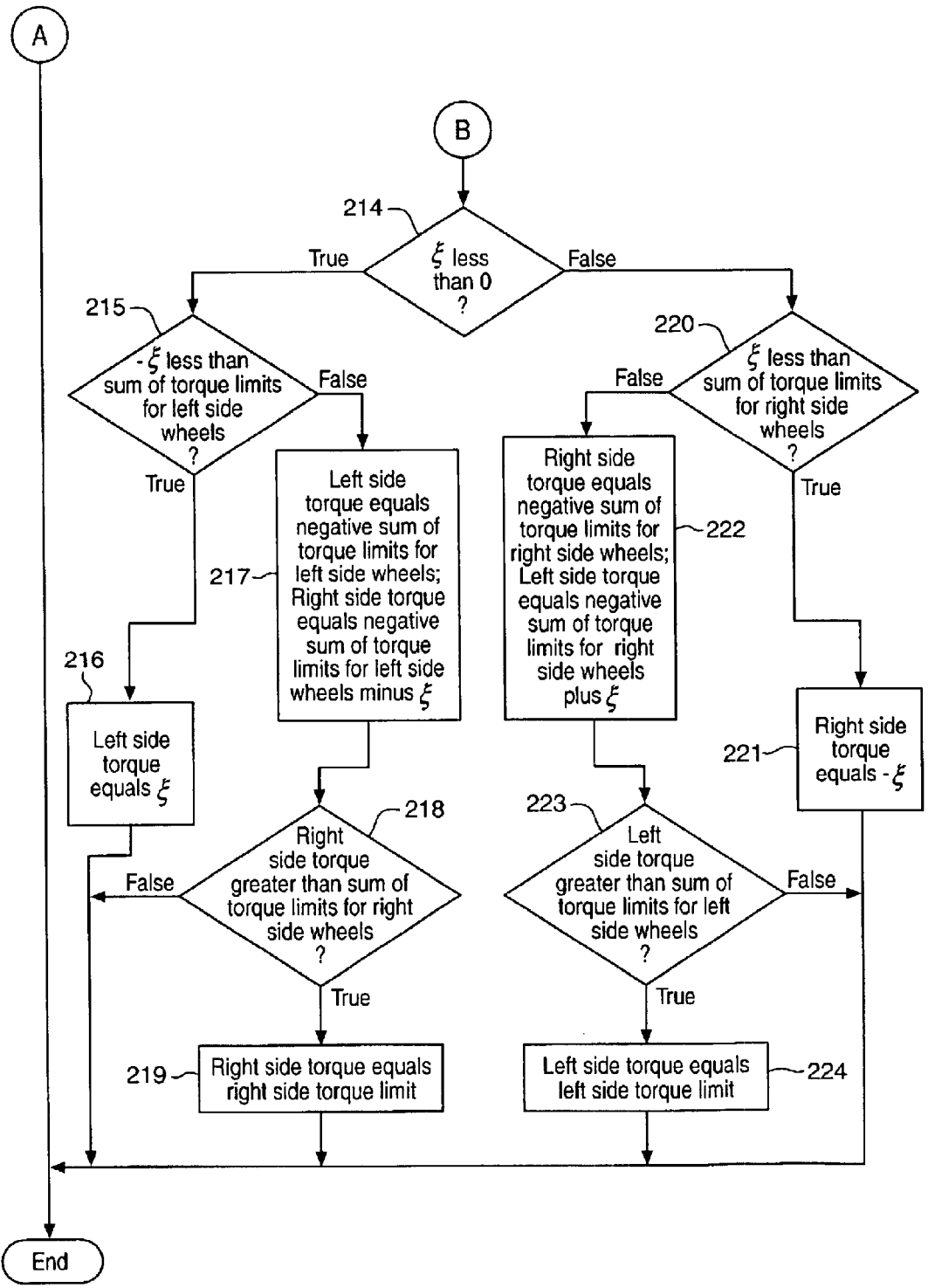

More specifically, in FIG. 6A, step 201 of routine 200 sets the value of ξ according to:

$$\xi = \frac{4MR_w}{t_f + t_r}$$

where M is the moment from step 102, $R_w$ is the rolling radius of the wheels, $t_f$ is the front track width (lateral spacing between the tires) and $t_r$ is the rear track width. Step 202 determines whether the net torque command p is positive. If p is positive, step 203 determines if the sign of ξ is positive. If ξ is positive, step 204 determines if ξ is less than the sum of the torque limits for left side wheels 11FL and 11RL. If ξ is less than the sum of the torque limits for left side wheels 11FL and 11RL, the left side torque is set equal to ξ in step 205, and routine 200 exits, as shown in FIG. 6B. If ξ is not less than the sum of the torque limits for left side wheels 11FL and 11RL, in step 206, the left side torque is set to equal the sum of the torque limits for left side wheels 11FL and 11RL, and the right side torque is set to equal the sum of the torque limits for the left side wheels minus ξ.

Step 207 then determines if the negative of the right side torque is greater than the sum of the torque limits for the right side wheels 11FR and 11RR. If so, then the right side torque is set to the value of the negative of the torque limits for the right side of the vehicle 40, in step 208, and routine 200 exits, as shown in FIG. 6B. If not, then routine 200 exits as shown in FIG. 6B.

Returning to step 203, if the sign of ξ is non-positive (negative or zero), then step 209 determines if the negative of ξ is less than the sum of the torque limits for right side wheels 11FR and 11RR. If so, the right side torque is set equal to the negative of ξ, in step 210, and routine 200 exits, as shown in FIG. 6B. If not, in step 211, the right side torque is set to equal the sum of the torque limits for right side wheels 11FR and 11RR, and the left side torque is set to equal the sum of the torque limits for the right side wheels plus ξ. Then, step 212 determines if the negative of the left side torque is greater than the sum of the torque limits for left side wheels 11FL and 11RL. If so, then the left side torque is set to the value of the negative of the torque limits for the left side of vehicle 40, in step 213, and routine 200 exits, as shown in FIG. 6B.

Returning to step 202, if the longitudinal torque command p is negative, then step 214 determines if the sign of ξ is negative (see FIG. 6B). If so, step 215 determines if the negative of ξ is less than the sum of the torque limits for left side wheels 11FL and 11RL. If so, the left side torque is set equal to ξ, in step 216, and routine 200 completes. If not, in step 217, the left side torque is set to equal the negative of the sum of the torque limits for left side wheels 11FL and 11RL, and the right side torque is set to equal negative of the sum of the torque limits for the left side wheels minus ξ.

Step 218 then determines if the right side torque is greater than the sum of the torque limits for right side wheels 11FR and 11RR. If so, the right side torque is set to the value of the torque limits for the right side of vehicle 40, in step 219, and routine 200 exits.

Returning to step 214, if the sign of ξ is positive or zero, then step 220 determines if ξ is less than the sum of the torque limits for right side wheels 11FR and 11RR. If so, the right side torque is set equal to the negative of ξ, in step 221, and routine 200 completes. If not, in step 222, the right side torque is set to equal the negative of the sum of the torque limits for right side wheels 11FR and 11RR, and the left side torque is set to equal the negative of the sum of the torque limits for the right side wheels plus ξ.

Step 223 then determines if the left side torque is greater than the sum of the torque limits for left side wheels 11FL and 11RL. If so, then the left side torque is set to the value of the torque limits for the left side of vehicle 40, in step 224, and routine 200 exits.

FIG. 7 shows further detail on the operation of step 104, FIG. 3, as an initial torque distribution routine 300, which controls how torque is distributed within a given side of vehicle 40. First, in step 301, the limits for each wheel $l_{fl}$, $l_{fr}$, $l_{rl}$, and $l_{rr}$ are placed in a matrix l according to:

$$l = \begin{bmatrix} l_{fl} & l_{fr} \\ l_{rl} & l_{rr} \end{bmatrix}$$

In step 302, the limits for each of the right and left sides (the sum of the limits for that side) are placed in a matrix S, according to $$S=[l_{11}+l_{21}\ l_{12}+l_{22}] \text{ or } S=[l_{fl}+l_{rl}\ l_{fr}+l_{rr}]$$

To avoid a divide-by-zero error later in step 307, steps 303–306 may replace either element of matrix S with a large number constant. In step 303, it is determined if $S_1$ is less than a threshold value h. If so, then $S_1$ is set to equal a large number constant g, in step 304. In this case, g may be large enough such that the quotient of the largest possible value for $q_l$ or $q_r$ and g approaches zero.

Step 305 then determines if $S_2$ is less than the threshold value h. If so, then $S_2$ is set to equal large number constant g, in step 306. In step 307, a matrix τ representing the output torque for each wheel is calculated based upon the ratio of the limit for a given wheel to the limit of the side as a whole, according to:

$$\tau = l \cdot \begin{bmatrix} \dfrac{q_l}{S_1} & \dfrac{q_r}{S_2} \\ \dfrac{q_l}{S_1} & \dfrac{q_r}{S_2} \end{bmatrix}$$

Torque is therefore assigned to the tires of wheels 11 with the highest limits, or the greatest capacity to handle the aforementioned torque.

In order to ensure that the vehicle operates predictably, the net output torque may always be less than or equal to the net torque command, such that the vehicle does not accelerate faster than the driver intended. The vehicle may, however, decelerate faster than the driver intended, or decelerate given a net torque command to accelerate, if this meets the desired yaw acceleration.

Figure 8:
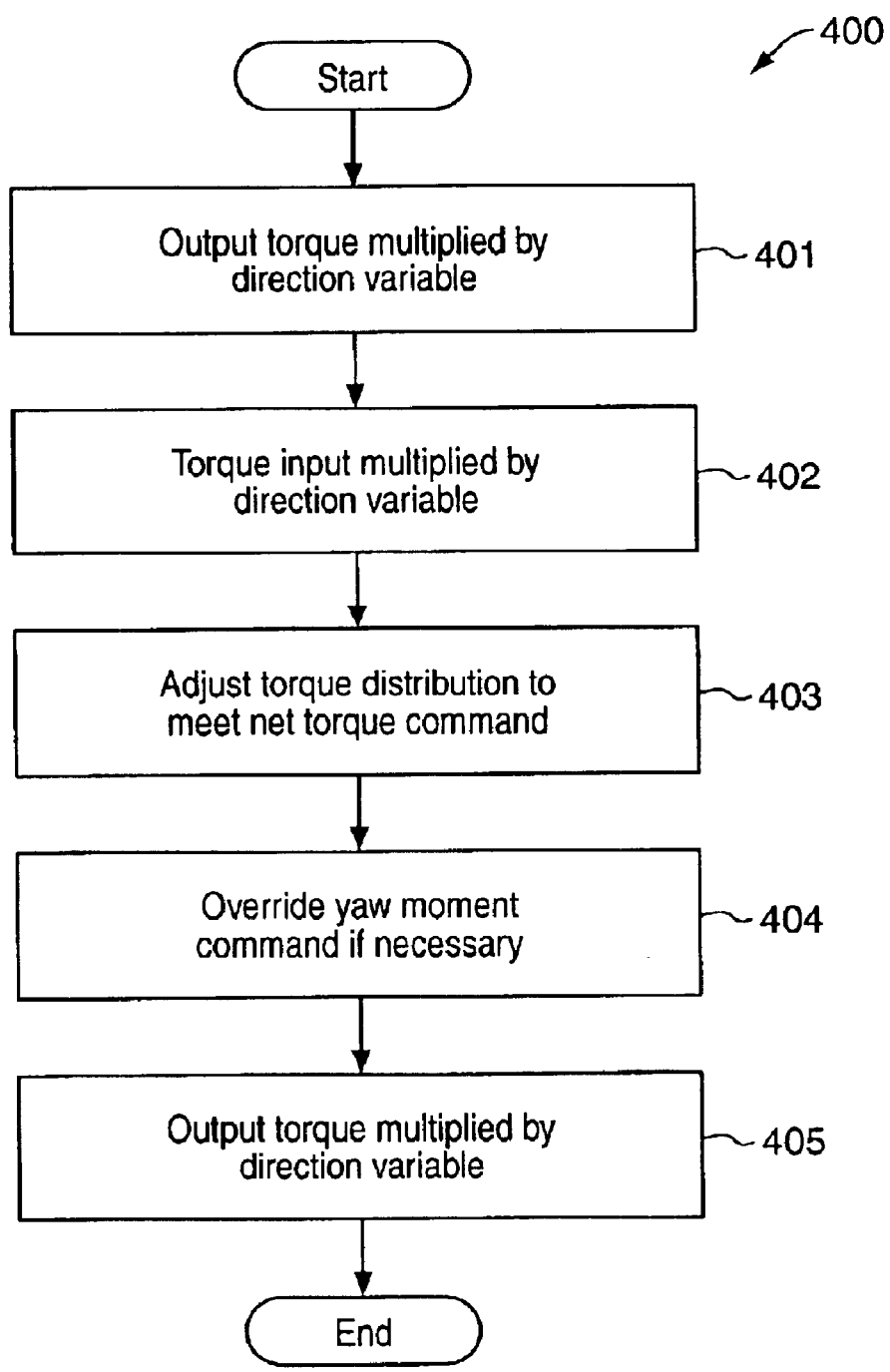
FIG. 8 shows a flowchart illustrating one routine that distributes torque.

One final torque distribution routine 400 is shown in FIG. 8, which details the operation of step 105, FIG. 3. Routine 400 adjusts the torque distribution produced by routine 300, FIG. 7, to meet the net torque command and to override the desired yaw moment if necessary. Steps 401, 402, and 405 allow routine 400 to be used for both forward direction 43A and reverse direction 43B for vehicle 40. In step 401, τ is multiplied by d, the direction of travel, where d is defined to be positive one if the driver intends the vehicle to move forward, and negative one if the driver intends the vehicle to move in reverse. In step 402, p is likewise multiplied by d. Subsequently, in step 403, the torque distribution is adjusted to meet the net torque command, i.e., torque may be added to or subtracted from both sides of the vehicle in equal amounts without affecting the net moment. Step 404 overrides the desired yaw acceleration if necessary. This may be done in either of two cases: (a) the torque distribution produced by step 402 results in a net torque that is greater than the net torque command; or (b) the speed of vehicle 40 is less than a certain threshold and the net torque produced by step 402 is less than the net torque command. The latter case allows all available torque to be utilized at low speeds to extract the vehicle from a low-friction situation. In step 405, $\tau$ is once again multiplied by d to ensure that the output torque values have the appropriate sign.

FIG. 9 details one operation of step 403, FIG. 8, as routine 500. Steps 501–503 determine whether a variable a represents either positive one or negative one based upon whether or not the current net torque is less than the commanded net torque. Specifically, in step 501, it is determined whether the torque command (p) is greater than the sum of the output torques, according to:

$$p > \sum_{i=1}^{2} \sum_{j=1}^{2} \tau_{ij}$$

If so, step 502 sets the variable a to positive one; if not, step 503 sets variable a to negative one. In step 504, a variable $\rho_l$ is determined as the absolute value of the difference between the product of a and the sum of the limits for left side wheels 11FL, 11RL of vehicle 40, and the sum of the current torque values for the left side of vehicle 40, according to:

$$\rho_l = \left| a \sum_{i=1}^{2} l_{i1} - \sum_{i=1}^{2} \tau_{i1} \right|.$$

In step 505, a variable $\rho_r$ is similarly determined for the right side of vehicle 40, according to:

$$\rho_r = \left| a \sum_{i=1}^{2} l_{i2} - \sum_{i=1}^{2} \tau_{i2} \right|.$$

Step 506 defines a variable $\kappa$ (kappa) to be the product of $\alpha$ and the lesser of the lesser of $\rho_l$ and $\rho_r$, and half the absolute value of the difference of the net torque command (p) and the current total net torque, according to:

$$\kappa = a \min\left\{ \min\{\rho_l, \rho_r\}, \frac{1}{2} \left| p - \sum_{i=1}^{2} \sum_{j=1}^{2} \tau_{ij} \right| \right\}.$$

Step 507 assigns the new value of the matrix $\tau$ to be the original value of $\tau$ plus the product of $\kappa$, the absolute value of the difference between the product of $\alpha$ and the matrix | and $\tau$, and a matrix with a left column composed of the inverse of $\rho_l$ and a right column composed of the inverse of $\rho_r$, according to:

$$\tau = \tau + \kappa |aI - \tau| \cdot \begin{bmatrix} \rho_l^{-1} & \rho_r^{-1} \\ \rho_l^{-1} & \rho_r^{-1} \end{bmatrix}.$$

Here, the absolute value of a matrix is defined to be a matrix of the absolute values of its elements. For example, if a matrix m is defined as $$m = \begin{bmatrix} m_{11} & m_{12} \\ m_{21} & m_{22} \end{bmatrix}$$

then $$|m| = \begin{bmatrix} |m_{11}| & |m_{12}| \\ |m_{21}| & |m_{22}| \end{bmatrix}.$$

FIG. 10 details one operation of step 404, FIG. 8, as routine 600, where the desired yaw acceleration may be overridden. Step 601 tests for a first condition where this may be desired: when the current net torque is greater than the net torque command p according to:

$$\sum_{i=1}^{2} \sum_{j=1}^{2} \tau_{ij} > p.$$

If the first condition is not met, then routine 600 continues at step 605. If the first condition is met, then step 602 sets variable $\rho$ to equal the current net torque and the sum of the limits on each wheel according to:

$$\rho = \sum_{i=1}^{2} \sum_{j=1}^{2} \tau_{ij} + \sum_{i=1}^{2} \sum_{j=1}^{2} l_{ij}.$$

In step 603, $\kappa$ is set to equal the lesser of $\rho$ and the difference between the current net torque and the net torque command, according to:

$$\kappa = \min\left\{ \rho, \sum_{i=1}^{2} \sum_{j=1}^{2} \tau_{ij} - p \right\}.$$

Then, in step 604, $\tau$ is assigned to be the original value of $\tau$ minus the product of $\kappa$, the sum of the matrices | and $\tau$, and a matrix whose elements are the inverse of $\rho$, according to:

$$\tau = \tau - \kappa (1 + \tau) \cdot \begin{bmatrix} \rho^{-1} & \rho^{-1} \\ \rho^{-1} & \rho^{-1} \end{bmatrix}.$$

Step 605 tests for a second condition where the moment may be overridden: when the current net torque is less than p and the absolute value of the current vehicle speed v is less than a threshold value $v_0$, according to $$p > \sum_{i=1}^{2} \sum_{j=1}^{2} \tau_{ij} \text{ and } |v| < v_0.$$

If the second condition is met, step 606 sets $\rho$ to equal the sum of the limits on each wheel minus the current net torque, according to:

$$\rho = \sum_{i=1}^{2} \sum_{j=1}^{2} l_{ij} - \sum_{i=1}^{2} \sum_{j=1}^{2} \tau_{ij}.$$

In step 607, $\kappa$ is set to equal the lesser of $\rho$ and the difference between the net torque command and the current net torque, according to:

$$\kappa = \min\left\{\rho, p - \sum_{i=1}^{2}\sum_{j=1}^{2} \tau_{ij}\right\}.$$

Finally, in step 608, τ is assigned to be the original value of τ plus the product of κ, the difference of the matrices | and τ, and a matrix whose elements are the inverse of ρ, according to:

$$\tau = \tau + \kappa(1-\tau) \cdot \begin{bmatrix} \rho^{-1} & \rho^{-1} \\ \rho^{-1} & \rho^{-1} \end{bmatrix}.$$

It is thus apparent that the torque distribution algorithm implemented through the LSR 19 and TDR 24 provides for distributing drive and braking torque among wheels 11 of vehicle 40. In certain embodiments, torque distribution system 10 provides precise response to a wide range of driver inputs and road conditions and allows vehicle 40 to optimize its use of available tractive forces by reacting to current conditions and by minimizing controller actions that produce wheel slip; system 10 does so without relying on complex, heavy, or inefficient mechanical components.

Certain advantages herein may thus minimize the risk of wheel slip, such as caused by a controller action, by assigning and distributing torques based on a ratio of the limit for one wheel to the sum of torque limits over all wheels. Certain other advantages may allow different users of the vehicle to customize handling to particular preferences. For instance, a conservative driver may set the system to exhibit understeer, while a driver with sporty preferences may set the system to exhibit oversteer. Certain other advantages may utilize control torque to any number of wheels, for example in two-, three-, four- (or more) wheeled vehicles.

In one exemplary operation of system 10, FIG. 2, system 10 may be employed within a hybrid vehicle to obtain certain other advantages. In the hybrid vehicle, one set of wheels (e.g., the front) are powered with a conventional internal combustion engine, and the other set of wheels (e.g., rear wheels) are powered by separate electric motors. The front wheels also have electronically-actuated friction brakes, and the rear wheels are braked either regeneratively, with friction brakes, or with both. The driver's longitudinal acceleration command is then fed to a primary controller that determines how the torque command is split between the internal combustion engine and the sum of the electric motors (e.g., electronic control unit 18 or a separate controller that provides ECU 18 with a net torque command for braking torque and for drive torque of rear wheels 11RR, 11RL); this determination may for example be made on the basis of efficiency gains, the charge state of the vehicle battery, traction considerations, and the like. During acceleration, system 10 controls the two electric motors as for a two-wheel drive vehicle; during braking, system 10 splits torque between the front brakes and the rear motors/brakes as it would for an AWD vehicle. In both cases, and when system 10 uses a combination of acceleration and braking to generate a corrective yaw moment, LSR 19 is unchanged. TDR 24 behaves similarly, except that when any driving torque assignment is made, only limits of wheels that may receive driving torque (in this case, the rear wheels) may be included in the calculation of that torque. In this case, limits for wheels accelerated by the internal combustion engine are set to zero. Accordingly, in this exemplary operation, system 10 handles ABS functions, traction control on the rear wheels, YMC on all wheels (two with braking and accelerating, and two with braking only), and drive torque for two wheels. Furthermore, the limits set in LSR 19 may be used by an external traction-control routine for the front wheels.

Since certain changes may be made in the above systems and methods without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A system for controlling torques applied to a plurality of wheels of a motor vehicle, comprising:
   one or more speed sensors for determining speed for each of the plurality of wheels;
   a vehicle yaw acceleration sensor for determining actual yaw acceleration of the vehicle;
   a desired yaw acceleration sensor for determining intended yaw acceleration for the vehicle;
   a net torque command sensor for determining intended vehicle direction and intended torque magnitude for the vehicle;
   an electronic control unit for processing data from the speed sensors, the vehicle yaw acceleration sensor, the desired yaw acceleration sensor and the net torque command sensor to generate torque signals for the plurality of wheels; and one or more torque producers, responsive to the torque signals, to vary torque applied to each of the plurality of wheels such that the wheels engage in one of acceleration and deceleration dependent upon driver intent and with controlled traction.

2. The system of claim 1, actual vehicle behavior being determined by the vehicle yaw acceleration sensor and the speed sensors, intended vehicle behavior being determined by the net torque command sensor and the desired yaw acceleration sensor, the electronic control unit comparing the actual vehicle behavior to the intended vehicle behavior to determine the torque signals such that the controlled traction reduces likelihood that one or more of the plurality of wheels slips or locks.

3. The system of claim 1, the torque producers being one of a motor, a motor controller, a servo amplifier, an inverter, and mixtures thereof.

4. The system of claim 1, the desired yaw acceleration sensor sensing one or more vehicle components of the vehicle.

5. The system of claim 4, the desired yaw acceleration sensor sensing velocity of the vehicle.

6. The system of claim 4, the desired yaw acceleration sensor sensing rate of change of angle of steered wheels relative to a body of the vehicle.

7. The system of claim 6, the rate of change comprising a time derivative of $\delta_f$.

8. The system of claim 6, the desired yaw acceleration sensor comprising one of an optical encoder, a potentiometer, a differentiator, and mixtures thereof.

9. The system of claim 6, one or both of the electronic control unit and desired yaw acceleration sensor comprising computational means that processes a desired yaw acceleration based on the rate of change of angle and an approximate vehicle velocity based on wheel velocities.

10. The system of claim 4, the desired yaw acceleration sensor utilizing vehicle velocity.

11. The system of claim 4, the components comprising one or more of a steering wheel, steering linkage, drive-by-wire control switches and mixtures thereof.

12. The system of claim 1, the speed sensors comprising one or more of optical encoders and magnetic induction sensors to measure angular velocity.

13. The system of claim 1, the net torque command sensor determining intended longitudinal acceleration of the vehicle.

14. The system of claim 1, the net torque command sensor sensing position of one or more vehicle components of the vehicle.

15. The system of claim 14, the components comprising one or more of a vehicle accelerator pedal, gas pedal, brake pedal, drive selector, drive-by-wire control switches and mixtures thereof.

16. The system of claim 1, the vehicle yaw acceleration sensor comprising one of a gyroscopic sensor, accelerometers, differentiating devices, and mixtures thereof.

17. The system of claim 1, the electronic control unit comprising limit setting routine means and torque distribution routine means.

18. The system of claim 17, the limit setting routine means generating limits for each of the torque producers based upon data from the speed sensors and the torque producers.

19. The system of claim 18, the torque distribution routine means distributing torque among the plurality of wheels based in part upon the limits.

20. The system of claim 1, the electronic control unit comprising torque distribution routine means for distributing torque among the plurality of wheels.

21. The system of claim 20, the torque distribution routine means distributing torque among the plurality of wheels based in part upon data from the vehicle yaw acceleration sensor, the net toque command sensor and the desired yaw acceleration sensor.

22. The system of claim 1, the electronic control unit determining a ratio of torque limits for each of the plurality of wheels to a sum of torque limits for the plurality of the wheels and distributing torque among the torque signals in achieving the controlled traction.

23. A software product comprising instructions, stored on computer-readable media, wherein the instructions, when executed by a computer, perform steps for controlling torque applied to wheels of a motor vehicle, comprising:

determining speed for each of the plurality of wheels;

determining actual yaw acceleration of the vehicle;

determining intended yaw acceleration for the vehicle;

determining intended vehicle direction and intended torque magnitude for the vehicle; and processing actual yaw acceleration, intended yaw acceleration, and intended torque magnitude of the vehicle and rotational velocity of each of the wheels to generate torque signals for the plurality of wheels; such that the wheels engage in one of acceleration and deceleration dependent upon driver intent and with controlled traction.

24. The software product of claim 23, further comprising determining a ratio of torque limits for each of the plurality of wheels to a sum of torque limits for the plurality of the wheels and distributing torque among the torque signals in achieving the controlled traction.

25. A system for distributing torque to a plurality of wheels of a motor vehicle, comprising:

limit setting routine means for receiving signals indicative of rotational velocity for each of the plurality of wheels and for generating limits for the torque; and torque distribution routine means for processing the limits with actual and intended yaw moments of the vehicle to designate the torque.

26. The system of claim 25, the limit setting routine also receiving signals indicative of the available torque for each of the plurality of wheels.

27. The system of claim 25, the torque distribution means distributing torque among the plurality of wheels as a function of a ratio of torque limits for each of the plurality of wheels to a sum of torque limits for the plurality of the wheels.

28. The vehicle of claim 28, further comprising:

a plurality of wheels;

one or more torque producers for applying torque to each of the plurality of wheels;

an internal combustion engine to drive a first pair of the plurality of wheels;

one or more electric motors to drive a second pair of the plurality of wheels;

one or more sensors for determining net torque, intended yaw acceleration and actual vehicle yaw acceleration; and means for processing data from the sensors to generate control signals to the torque producers wherein torque is distributed among the plurality of wheels with controlled traction, the means for processing data distributing torque between the first pair and second pair being based upon one or more of a charge state of a vehicle energy storage device, a speed of the vehicle, and traction requirements.

29. The vehicle of claim 28, the first pair of the plurality of wheels comprising friction brakes responsive to the control signals, the second pair of the plurality of wheels comprising one or both of regenerative brakes and friction brakes that are responsive to the control signals.

30. The vehicle of claim 29, the means for processing data generating the control signals for the second pair of wheels during acceleration and generating the control signals for the first and second pairs during deceleration.

31. A system for controlling torques applied to a plurality of wheels of a motor vehicle, comprising:

one or more speed sensors for determining speed for each of the plurality of wheels;

means for determining intended vehicle direction, intended torque magnitude for the vehicle and actual yaw acceleration;

an electronic control unit for processing data from the speed sensors to generate a target yaw moment for distribution among the plurality of wheels; and one or more torque producers, responsive to torque signals indicative of the target yaw moment to vary torque applied to each of the plurality of wheels such that the wheels engage in one of acceleration and deceleration dependent upon driver intent and with controlled traction.

32. The system of claim 31, further comprising means for generating the target yaw moment based upon the actual yaw rate of the vehicle, the desired yaw rate of the vehicle, and the moment of inertia of the vehicle.

* * * * *